United States Patent [19]

DiPietro

[11] 4,416,254

[45] Nov. 22, 1983

[54] FLUE STRUCTURE FOR DOMESTIC HEATING EQUIPMENT

[76] Inventor: Raymond B. DiPietro, 205 S. Central Ave., Minoa, N.Y. 13116

[21] Appl. No.: 301,981

[22] Filed: Sep. 14, 1981

Related U.S. Application Data

[63] Continuation-in-part of Ser. No. 147,358, May 7, 1980, abandoned.

[51] Int. Cl.³ .............................................. F23J 11/00
[52] U.S. Cl. .................................... 126/307 A; 98/48; 126/112; 126/312; 237/55
[58] Field of Search ............... 126/307 R, 307 A, 312, 126/77, 112, 299 R, 301, 302, 110 R; 98/46, 48, 58; 237/50, 55; 110/147, 160

[56] References Cited

U.S. PATENT DOCUMENTS

| 1,522,898 | 1/1925 | Messick | 110/147 |
|---|---|---|---|
| 1,837,581 | 12/1931 | Peterson | 126/312 |
| 2,002,020 | 5/1935 | Nyborg | 126/312 |
| 2,711,683 | 6/1955 | Ryder | 126/112 |
| 4,009,705 | 3/1977 | Smith | 126/312 |
| 4,079,727 | 3/1978 | Smith | 126/307 A |
| 4,187,833 | 2/1980 | Zahora et al. | 126/312 |
| 4,215,814 | 8/1980 | Ebert | 126/307 R |
| 4,257,393 | 3/1981 | Liberacki | 126/307 A |
| 4,294,223 | 10/1981 | Montague | 126/112 |
| 4,306,539 | 12/1981 | Silva | 126/307 A |

Primary Examiner—Daniel J. O'Connor
Attorney, Agent, or Firm—Bruns & Jenney

[57] ABSTRACT

Improved flue structure for domestic heating equipment such as a gas fired hot water heater. In conventional gas fired water heaters, the heater is directly connected to a chimney or the like by a single flue pipe and this results in a wasteful loss of heat and inefficient use of fuel. The invention provides a multiple, interconnected flue pipe arrangement whereby a substantial portion of the heat produced by the gas burner is trapped in the flue structure keeping it in the system longer and thereby materially cutting down on the heat loss. In one embodiment of the invention, a flue pipe from the heater is connected to the upper end of a second flue pipe that is closed at its top and a third flue pipe, concentrically mounted in the second flue pipe, conducts the heater flue gases to the chimney. Due to the arrangement of these pipes as will be described in detail hereinafter, heat is trapped at the upper end of the second flue pipe resulting in a substantial increase in efficiency.

2 Claims, 7 Drawing Figures

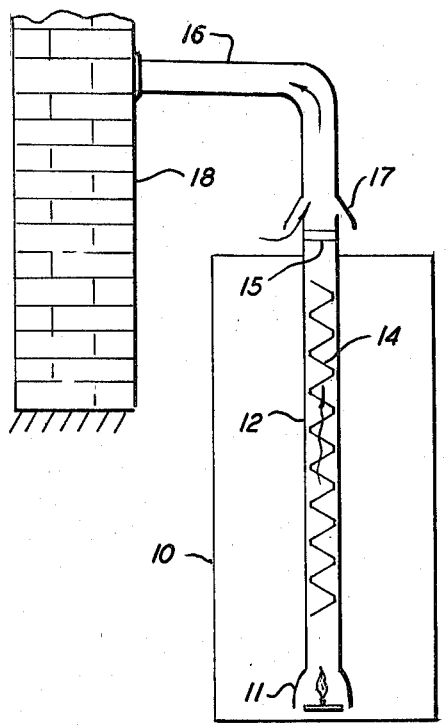
FIG. 1
Prior Art
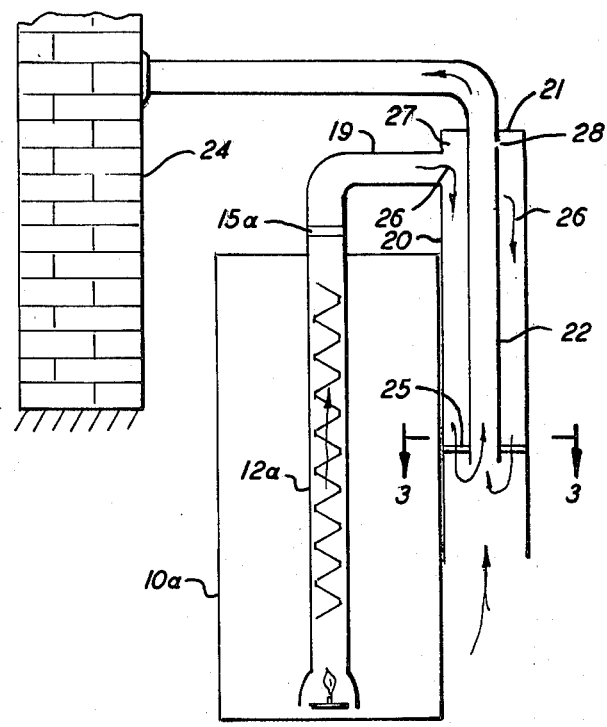
FIG. 2
FIG. 3
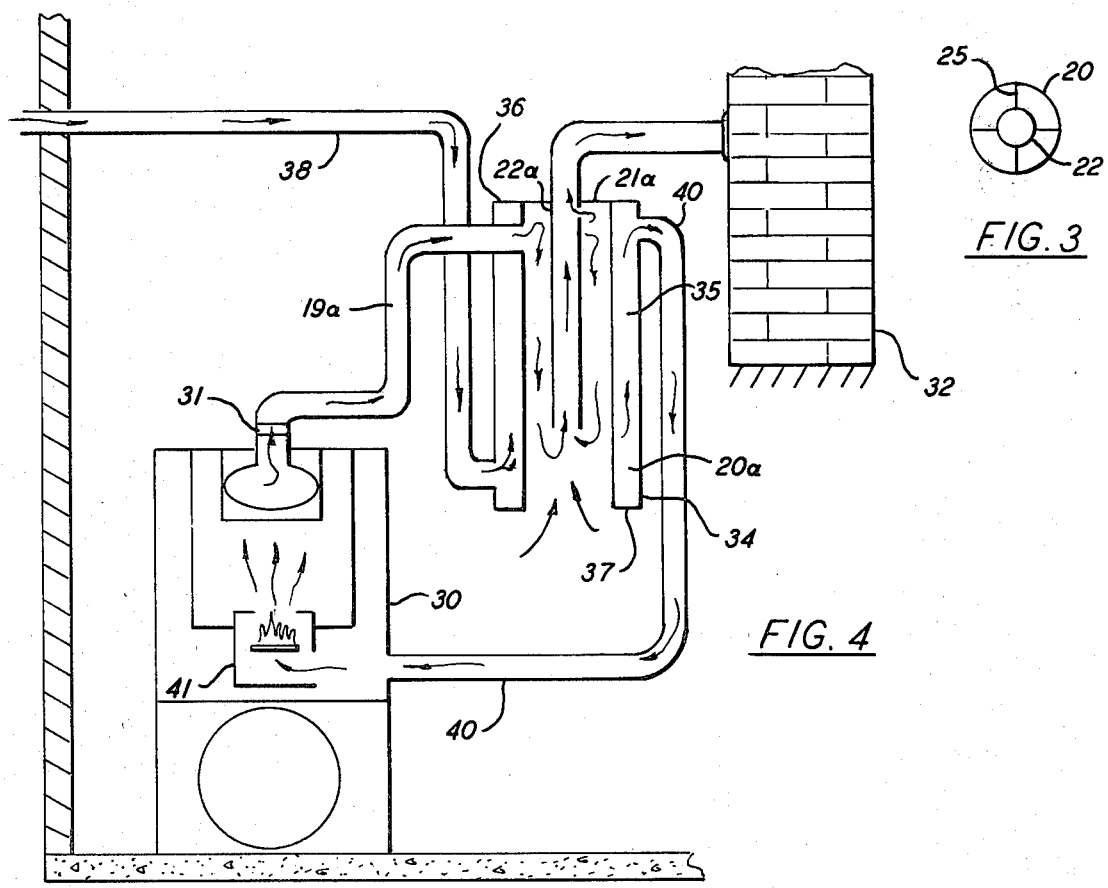
FIG. 4

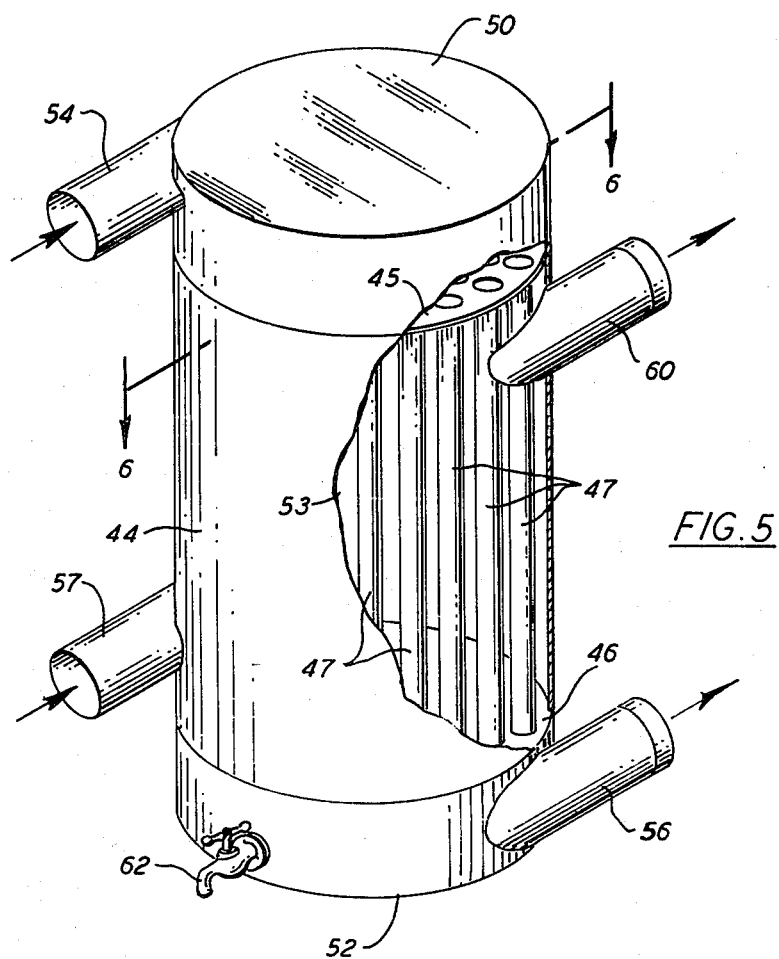
FIG. 5
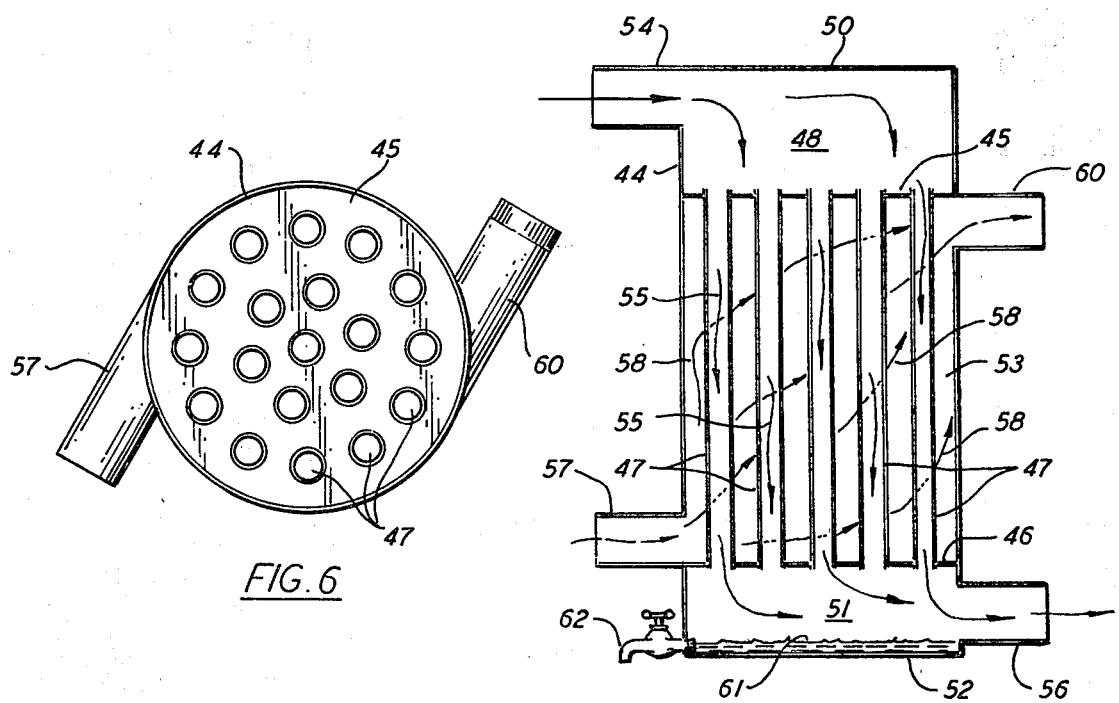
FIG. 6
FIG. 7

1

FLUE STRUCTURE FOR DOMESTIC HEATING EQUIPMENT

BACKGROUND OF THE INVENTION

This application is a continuation-in-part of Ser. No. 147,358, May 7, 1980, now abandoned.

This invention relates generally to heating equipment, and has particular reference to an improved flue structure for use in domestic heating equipment.

In conventional gas fired water heaters, the heater is directly connected to a chimney or the like by a single flue pipe. This creates a direct path from the interior of the heater to the outside and when the burner is on, much of the heat that should be heating the water is lost up the chimney. Even when only the pilot is on, the heat it produces passes quickly up the chimney with the result that the water cools much faster than it should and after a relatively short period of time, the thermostat calls for the main burner to go on again.

The closest prior art known to the applicant are patents noted in a preliminary search. These are: U.S. Pat. Nos. 1,845,581; 1,933,056; 1,935,632; 2,064,080; 2,563,817; 4,012,191; and 4,037,567.

SUMMARY OF THE INVENTION

The flue structure of the present invention comprises a multiple, interconnected flue pipe configuration which is arranged so that a substantial portion of the heat produced by the gas burner is trapped in the flue structure before it eventually escapes up the chimney. This keeps the heat in the flue system longer and materially reduces the heat loss. In one embodiment of the invention, the flue structure comprises a first flue pipe that is connected at one end to the heating equipment—gas fired water heater, furnace or the like—and its other end to the sidewall of a second flue pipe near the upper end thereof. The second flue pipe is closed at its upper end and open at its lower end and has concentrically mounted within it a third, smaller diametered flue pipe.

The lower end of the third flue pipe terminates a predetermined distance above the lower end of the second pipe and its upper end passes through the closed upper end of the second pipe and then extends to the chimney. With this arrangement, the heat produced by the heating equipment passes from the first flue pipe into the upper end of the second flue. It then flows down in the annular area between the second and third pipes to the bottom of the latter where it enters the third pipe and flows up through it to the chimney. The construction described causes heat to be trapped in the annular area adjacent the upper end of the second flue pipe and thus causes it to remain in the system longer whereby the heat loss is materially reduced.

In another embodiment of the invention, the flue structure comprises a tank-like structure having a plurality of spaced, parallel tubes in its interior extending between a pair of manifold plates located adjacent the top and bottom of the structure. Flue gases from the heating equipment enter near the top of the structure, flow down through the tubes and leave through an outlet adjacent the lower end of the structure, the outlet being connected to the chimney. Outside cold air is also passed through the structure to provide pre-heated combustion air for the heating equipment. The outside air enters the structure near its lower end, flows up between the spaced tubes and leaves through an outlet adjacent the top of the structure.

BRIEF DESCRIPTION OF THE DRAWINGS

FIG. 1 is a schematic illustration of a gas fired hot water heater having a conventional flue pipe arrangement;

FIG. 2 is a schematic illustration corresponding to FIG. 1 but showing a flue structure embodying the invention;

FIG. 3 is a horizontal sectional view taken on line 3—3 of FIG. 2;

FIG. 4 is a schematic illustration of a modification of the invention;

FIG. 5 is a perspective view of another modification of the invention with a portion broken away to show part of the interior construction;

FIG. 6 is a horizontal sectional view taken on line 6—6 of FIG. 5; and

FIG. 7 is a schematic vertical sectional view through the modification of FIG. 5.

DESCRIPTION OF THE PREFERRED EMBODIMENT

Referring now to the drawings, and with particular reference to FIG. 1 illustrating the prior art, there is shown schematically a gas fired hot water heater 10 having a pilot light (not shown), a main burner element 11 and an internal vent or flue 12, the latter having some type of baffle arrangement 14 to slow the passage of the heat from the burner up the flue. The upper end of internal flue 12 terminates above the upper end of the heater in a connection 15 to which an external flue pipe 16 is attached, it being necessary with flue pipes of different diameters to employ an adapter (not shown). The external flue pipe 16 may have incorporated therein a draft hood or diverter 17 the purpose of which is to allow cooler ambient air to mix with the flue gases and cool them before entering the chimney 18. As noted above, this arrangement provides a direct gas flow route from the heater to the chimney and results in excessive heat loss.

FIG. 2 schematically illustrates the flue structure of the invention as applied to a gas fired water heater 10a such as that shown in FIG. 1. In this view, the external connection 15a at the upper end of the internal flue 12a is connected to an L-shaped flue pipe 19 which leads into a second, larger diametered flue pipe 20. The pipe 20 is supported in a substantially vertical position by securing it by any suitable means to the outer shell of heater 10a. Pipe 20 is closed at its upper end 21 and pipe 19 is connected to the sidewall of pipe 20 just below this closed upper end as shown.

A third flue pipe 22 having a smaller diameter than flue pipe 20 is concentrically mounted within the latter, the pipe 22 passing in sealed relation through the upper closed end 21 of pipe 20 and then extending to a chimney 24. The lower end of flue pipe 22 is open and terminates a predetermined distance above the open lower end of pipe 20 as indicated. The lower end of pipe 22 is maintained in concentric relation to pipe 20 by a plurality of radial vanes 25, FIGS. 2 and 3.

With the flue structure just described, heat and combustion gases from the water heater pass up through the pipe 19 and enter the upper end of flue pipe 20. The heat and gases must then flow downwardly as indicated by the arrows 26 until they reach the open lower end of inner flue pipe 22. In the area adjacent the lower end of pipe 22, the heat and gases mix with cooler ambient air that enters the open lower end of pipe 20 and this mixture passes up through pipe 22 to the chimney 24. As the combustion heat and gases travel this relatively devious path, it will be apparent that the heat will tend to collect and remain in the annular area 27 adjacent the closed upper end of pipe 20. This greatly slows the passage of heat out of the water heater thus allowing it to more efficiently heat the water. Even when only the pilot is on, the longer retention of its heat within the heater means that the water will stay hot longer and the main burner will be called upon less frequently.

In the area 27 at the upper end of pipe 20, the inner flue pipe 22 has a small aperture 28 in its side wall to prevent a build up of natural gas when the heater is being lighted, the aperture operating in effect as a safety valve. In addition, the passage of gases through the aperture 28 helps to create a draft up the inner pipe 22 and the heat of the gases minimizes the accumulation of moisture which is damaging to the pipes.

FIG. 4 illustrates a modification of the flue structure of the invention wherein the structure is applied to a combustion furnace 30 of conventional design. In this modification, the inner part of the structure is the same as that shown in FIG. 2. Thus, there is a first flue pipe 19a leading from an external connection 31 on the furnace to a second flue pipe 20a closed at its upper end. A third, smaller diametered flue pipe 22a is concentrically mounted in the pipe 20a and, after passing through its closed upper end 21a, leads to a chimney 32.

In the FIG. 4 modification, the second flue pipe 20a is encircled by a cylindrical jacket 34, and the annular chamber 35 between the pipe and jacket is closed at its upper and lower ends 36,37 as shown. The chamber 35 serves as a pre-heater for combustion air for the furnace and to this end a pipe 38 delivers air from outside the building to the lower part of the chamber. This outside air rises and is heated by the hot flue gases in the flue pipe 20a. When the air reaches the upper end of pipe 20a, it enters a pipe 40 which takes it to the combustion chamber 41 of the furnace.

FIGS. 5-8 illustrate another modification of the flue structure of the invention wherein the structure includes an outer tank 44 in the form of a closed ended hollow cylinder. Mounted in the tank are upper and lower manifold plates 45,46 that are respectively parallel to and spaced from the upper and lower ends of the tank as shown. A plurality of spaced apart tubes 47 of copper or stainless steel extend between the manifold plates 45,46, the tubes being parallel to one another and to the longitudinal axis of the tank.

The ends of the tubes 47 are secured to the manifold plates as by soldering, brazing or welding, and the upper ends of the tubes communicate with a chamber 48 between the top 50 of the tank and upper manifold plate 45 while the lower ends of the tubes communicate with a chamber 51 between the lower manifold plate 46 and bottom 52 of the tank. In between the manifold plates is a third chamber 53 through which the tubes pass but which is sealed from the tubes and from the chambers 48 and 51.

At the upper end of the chamber 48 there is an inlet pipe 54 for receiving the hot flue gases from a combustion furnace such as that shown at 30 in FIG. 4. These gases pass down through the tubes 47 as indicated by arrows 55, enter the chamber 51 and exit from the latter through an outlet pipe 56. The outlet pipe will be connected to the chimney by a suitable pipe (not shown).

The center chamber 53 through which the tubes 47 pass serves as a pre-heater for combustion air for the furnace and to this end the chamber has an inlet pipe 57 for receiving cool outside air which passes up between the tubes as indicated by the arrows 58 and leaves the chamber through an outlet pipe 60. The outlet pipe will be connected to the furnace combustion chamber by a suitable pipe (not shown).

The cool air passing through the chamber 53 causes a substantial amount of the moisture carried by the flue gases to condense in the tubes 47 and the condensate runs down the insides of the tubes and collects at the bottom of the tank as shown at 61. This condensate can be drained from the tank through a suitable valve such as the faucet 62.

As best shown in FIGS. 5 and 6, the two sets of inlet and outlet pipes are disposed tangentially with respect to the tank 44. This causes the incoming gases to circulate rather than stratify and this makes the heat exchange operation more efficient.

As in the previously described modifications of the invention, the flue structure disclosed in FIGS. 5-7 prevents the direct passage of hot flue gases to the chimney and thus enables the heating equipment to operate more efficiently. At the same time, the cooler flue gases reaching the chimney permit the latter to be reduced in size. The feeding of fresh pre-heated air to the furnace is also beneficial because the oxygen supply is continually replenished and a positive pressure is created in the building being heated.

Another advantage of the structure of FIGS. 5-7 is that of drawing most of the water out of the flue gases. The water is, or course, corrosive and in addition flue gas moisture that escapes from the chimney becomes a source of acid rain. To minimize corrosion in the tank 44, its interior and the manifold plates 45,46 can be coated with Teflon or a lead-tin composition, or even glass.

From the foregoing description it will be apparent that the invention provides a novel and very advantageous flue structure that substantially increases the efficiency of heating equipment. As will be understood by those familiar with the art, the invention may be embodied in other specific forms without departing from the spirit or essential characteristics thereof.

I claim:

1. For use in domestic heating equipment having a connection for attaching an external flue pipe thereto, improved external flue structure comprising a first flue pipe adapted to be connected at one end to the heating equipment connection, the other end of the first flue pipe being connected to the sidewall of a second flue pipe, the second flue pipe being vertically disposed and having a closed upper end and open lower end, the first flue pipe being connected to the second flue pipe sidewall a short distance below its closed upper end, a third flue pipe of smaller diameter than the second flue pipe and positioned in the latter in substantially concentric relation thereto, the upper end of the third flue pipe passing in sealed relation through the closed upper end of the second flue pipe and extending into communication with a chimney, the lower end of the third flue pipe being open and terminating a predetermined distance above the lower end of the second flue pipe whereby flue gases from the heating equipment pass into the second flue pipe and flow downwardly therein until they enter the lower end of the third flue pipe and pass upwardly therein to the chimney, a cylindrical jacket member concentric with and surrounding the second flue pipe, the jacket member being closed at its upper and lower ends whereby a closed annular chamber is formed between the second flue pipe and member, a first conduit means communicating with the lower end of the chamber for delivering outside air to the chamber, and a second conduit means connecting the upper end of the chamber to the heating equipment whereby preheated air for combustion is delivered to the latter.

2. Flue structure as defined in claim 1 wherein the third flue pipe is formed with an aperture in its sidewall below the closed upper end of the second flue pipe to provide communication between the interiors of the second and third flue pipes.

* * * * *